United States Patent [19]
Ohuchida

[11] Patent Number: 5,428,588
[45] Date of Patent: Jun. 27, 1995

[54] OPTICAL HEAD

[75] Inventor: Shigeru Ohuchida, Zama, Japan

[73] Assignee: Ricoh Company, Ltd., Tokyo, Japan

[21] Appl. No.: 120,835

[22] Filed: Sep. 15, 1993

[30] Foreign Application Priority Data

Sep. 18, 1992 [JP] Japan .................. 2-249332
Jul. 19, 1993 [JP] Japan .................. 5-177715

[51] Int. Cl.⁶ .............................................. G11B 7/12
[52] U.S. Cl. ........................ 369/44.12; 369/44.23;
369/44.24; 369/112; 369/110
[58] Field of Search ............ 369/44.35, 44.32, 46.32,
369/44.28, 44.41, 112, 13, 110, 53, 54, 44.23,
44.12, 44.24

[56] References Cited

U.S. PATENT DOCUMENTS

| | | | |
|---|---|---|---|
| 5,120,136 | 6/1992 | Oakley | 369/112 X |
| 5,200,946 | 4/1993 | Fritz | 369/112 |
| 5,206,852 | 4/1993 | Kim et al. | 369/112 |
| 5,235,574 | 8/1993 | Aviles et al. | 369/44.32 X |
| 5,272,685 | 12/1993 | Ando | 369/112 X |

FOREIGN PATENT DOCUMENTS 63-263637 10/1988 Japan .

*Primary Examiner*—Georgia Y. Epps
*Assistant Examiner*—Muhammad Edun
*Attorney, Agent, or Firm*—Oblon, Spivak, McClelland, Maier, & Neustadt

[57] ABSTRACT

The present invention relates to an optical head for recording, reproducing and erasing data on an optical data recording medium. The optical head has a fixed optical system having a laser optical source for emitting a light and a signal detecting optical system for detecting an error signal. A movable optical system having a beam splitter provided with a prism boundary face and having an objective at a position thereof opposing a surface of the optical data recording medium for receiving the emitted light through the beam splitter and focusing the received light onto the surface of the optical data recording medium as an optical spot. The beam splitter has, at the prism boundary face thereof, a polarizing film for transmitting one portion of the emitted light from the laser light source. The beam splitter has, at one side face thereof, reflective face for reflecting one portion of or all of the transmitted light through the polarizing film, and has, at another side face thereof, a light receiving element thereof for receiving the reflected light from the reflective face and one portion of said reflected light from the surface of the optical data recording medium.

8 Claims, 14 Drawing Sheets a−b>0 a−b=0 a−b<0

OPTICAL HEAD

BACKGROUND OF THE INVENTION

1. Field of the Invention

The present invention relates to an optical head provided with separate type fixed and movable optical systems.

2. Description of the Related Arts

One example of a construction of a conventional optical head will be described hereinafter referring to FIG. 18a. FIG. 18a shows one embodiment of a separate type optical head provided with a fixed optical system 1 and a movable optical system 2. In the fixed optical system 1, a light emitted from a semiconductor laser 3 is transmitted or reflected by a first beam splitter 4 and is divided into two lights A and B.

The transmitted light A is reflected on a second beam splitter 5, and is turned in a perpendicular direction by a reflective mirror 6 disposed within the movable optical system 2, and after passing through an objective 7, the Light A irradiates a surface of an optical data recording medium 8 to record data thereon. Then, a reflective light from the recording medium 8 follows the incident optical path reversely to be led again into the fixed optical system 1, and the light is transmitted through the beam splitter 5 to be received by a half-split light receiving element 9. Then, a tracking error signal is detected by using a known push-pull method etc. to carry out a tracking servo.

While, the light B reflected on the beam splitter 4 is led to a half mirror 10. As shown in FIG. 18b, one portion of the light B is transmitted through the half-split light receiving element 11 having two light receiving faces a, b. The rest of the light B is reflected by the half mirror 10 to be led to a light receiving element 12. When the optical axis of the light B is relatively offset with respect to the movable optical system 2, incident light amounts onto the light receiving faces a, b of the light receiving element 11 are different from each other. An output of a differential amplifier 13 is therefore positive or negative. When the optical axis of the light B is relatively inclined with respect to the movable optical system 2, the incident light amounts onto two light receiving faces c, d of the light receiving element 12 are different from each other, and an output of a differential amplifier 14 is positive or negative. Based on the above, an inclination of the optical axis is corrected by servo mechanism (not shown) such that both outputs of the differential amplifier 13, 14 are 0. Thus, the tracking offset can be removed.

In the signal detecting method having the aforementioned conventional construction, two lights i.e. the light A for detecting the signal and the light B for correcting the offset of the optical axis are used. The offset of the optical axis of the light A for detecting the signal is read out by using the light B for correcting the offset of the optical axis instead of the light A. Therefore, an actual offset of the optical axis is not detected and, thereby, not corrected exactly. The slightest inclination in the arrangement position between the two beam splitters 4, 5 prevents the two lights from advancing in parallel to each other toward the movable optical systems. If the two lights A, B are not parallel to each other, exact outputs of the light receiving elements 11, 12 may not be obtained.

Further, the tracking offset caused by the offset of the optical axis is determined by the offset and the inclination of the optical axis on the reflective mirror 6. If the offset of the optical axis is detected by an optical element attached on a casing of the movable optical system 2, correction of the actual offset of the optical axis can not be always performed exactly due to assembling accuracy of the casing and attaching error of the reflective mirror.

In addition to the light receiving element for detecting a tracking error signal, a light receiving element for correcting a tracking error signal is needed. The increase of the number of such light receiving elements leads to also increase the number of electric circuits and adjustment parts and, therefore, the conventional optical head is disadvantage in production cost.

SUMMARY OF THE INVENTION

It is therefore an object of the present invention to provide a optical head in which a reflective light from the optical data recording medium is used to detect a tracking error signal by a push-pull method, and simultaneously one portion of the reflective light is separated by a polarizing film of a beam splitter to be led to a light receiving element for correcting a tracking offset so that a track offset caused by the offset of the optical axis can be removed.

Above object of the present invention can be achieved by an optical head for recording, reproducing and erasing data on an optical data recording medium, comprising:

a fixed optical system having a laser optical source for emitting a light, and a signal detecting optical system for detecting an error signal; and a movable optical system a beam splitter provided with a prism boundary face, and having an objective at a position thereof opposing to a surface of the optical data recording medium, the objective for receiving the emitted light from the laser light source through the beam splitter and focusing the received light onto the surface of the optical data recording medium as an optical spot, the beam splitter having at the prism boundary face thereof a polarizing film for transmitting one portion of the emitted light from the laser light source, having at one side face thereof a reflective face for reflecting one portion of or all of the transmitted light through the polarizing film, and having at another side face thereof a light receiving element for receiving the reflected light from the reflective face and one portion of the reflected light from the surface of the optical data recording medium.

According to the optical head, a reflective light from the optical data recording medium is used to detect a tracking error signal by a push-pull method, and simultaneously one portion of the reflective light is separated by a polarizing film of a beam splitter to be led to a light receiving element for correcting a tracking offset so that a track offset caused by the offset of the optical axis can be removed. Thus, a stable tracking error signal with high reliability can be detected. Further such a separate type optical system can be employed also to an optical disc device having a long stroke, and a quick access can be realized. Furthermore, a parallel degree between a seek direction and an optical axis direction of the movable optical system can be adjustable less strictly. Therefore the assembling of the device is facilitated, and the production cost can be reduced.

Above objects of the present invention can be achieved by another optical head for recording, reproducing and erasing data on an optical data recording medium, comprising:

a fixed optical system having a laser optical source for emitting a light, and a signal detecting optical system for detecting an error signal; and a movable optical system having a beam splitter for transmitting one portion of the emitted light from the laser optical source, having an objective at a position thereof opposing to a surface of the optical data recording medium, the objective for receiving the emitted light from the laser optical source through the beam splitter and focusing the received light onto the surface of the optical data recording medium as an optical spot, and having a light receiving element for correcting an offset of an optical axis at an optical path passing through the beam splitter.

According to the another optical head, to the track error signal detected by the push-pull method is added a signal for correcting the offset of the optical axis, which is an output from the light receiving element for correction the offset of the optical axis, whereby the tracking offset resulted from the offset of the optical axis can be removed, and a stable track error signal with high reliability can be obtained. Further, such construction makes less strict the parallel degree between the seek direction and the optical axis direction of the movable optical system, therefore assembling of the device is facilitated. Furthermore, and the production cost of the device can be reduced.

The above object of the invention can be achieved by a still another optical head for recording, reproducing and erasing data on an optical data recording medium, comprising:

a fixed optical system having a laser optical source for emitting a light, and a signal detecting optical system for detecting an error signal; and a movable optical system having a beam splitter provided with an inclined reflective face for reflecting one portion of the emitted light from the laser optical source at a different angle from the emitted light without reflecting the emitted light to the optical data recording medium, having an objective at a position thereof opposing to a surface of the optical data, the objective for receiving the emitted light through the beam splitter and focusing the received light onto the surface of the optical data recording medium as an optical spot, the signal detecting optical system further including a light receiving element for detecting the light which is reflected on the inclined reflective face and returns to the fixed optical system.

According to the still another optical head, the light receiving element for correcting the optical axis is attached onto the same plate as that for the light receiving element for a reproducing signal and a servo signal (track error signal or the like), so that the number of the light receiving element can be reduced. Thus, the electric circuit is simplified, and a small sized and low cost device can be realized.

Further objects and advantages of the present invention will be apparent from the following description of the preferred embodiments of the invention as illustrated in the accompanying drawings.

DESCRIPTION OF THE PREFERRED EMBODIMENTS

Figure 2C:
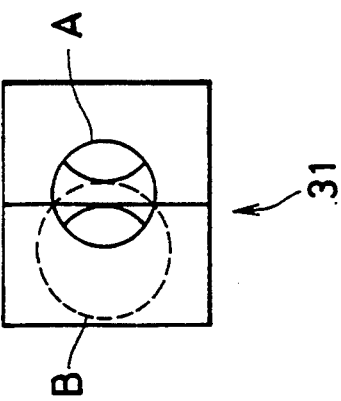
FIG. 2a to FIG. 2c are explanatory views showing a state of an optical spot received onto a light receiving element.
Figure 2B:
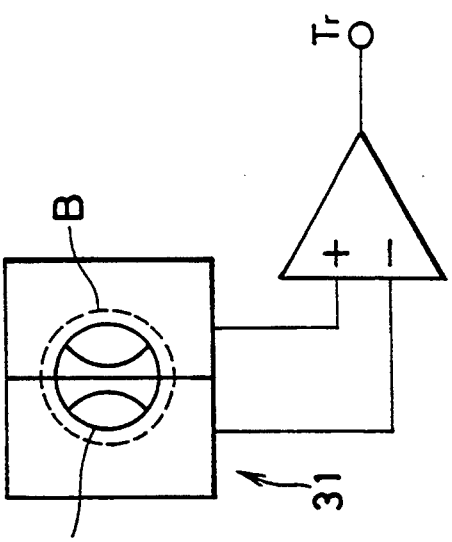
Figure 2A:
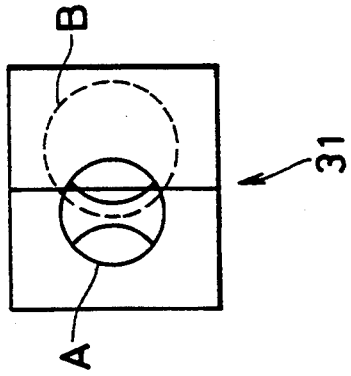
Figure 3:
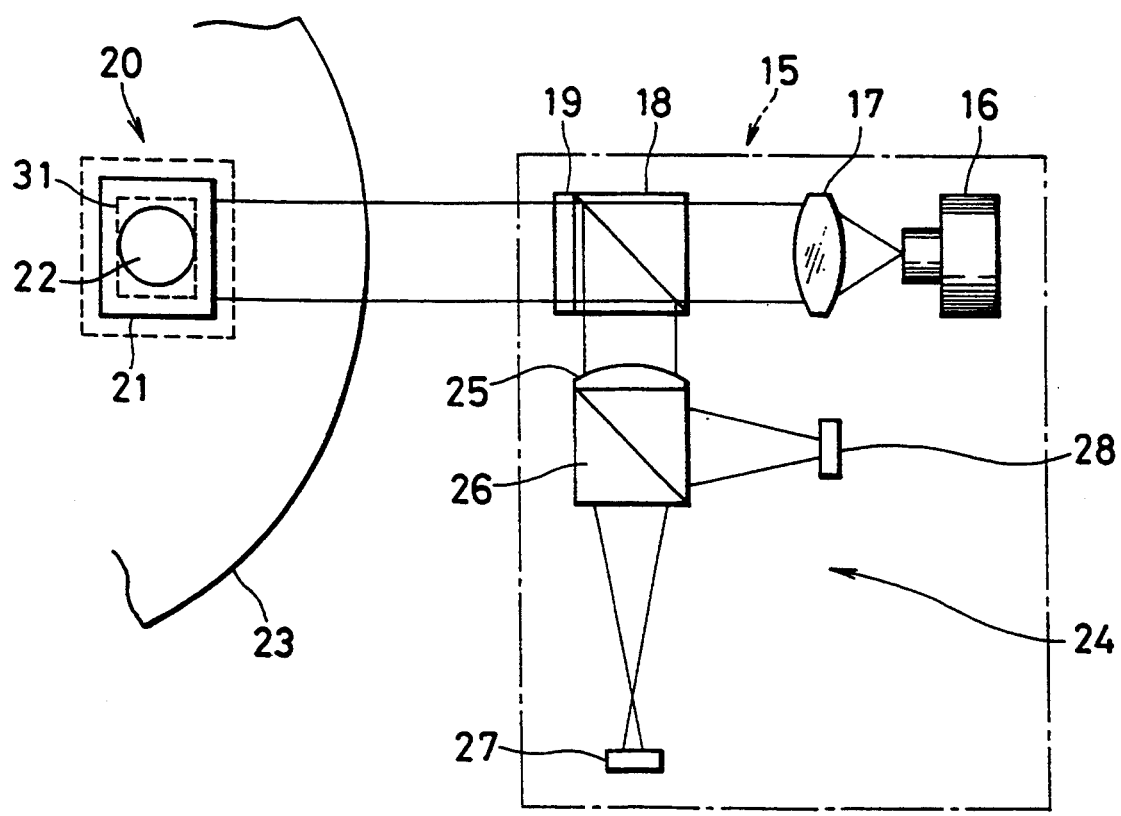
FIG. 3 is a plan view showing one embodiment of the first optical head of the present invention.

A first optical head according to the present invention will be described referring to FIGS. 1 to 3. First, a general construction of a device according to the first optical head will be described referring to FIG. 3. In a fixed optical system 15, a light emitted from a semiconductor laser 16 as a laser optical source is collimated by a collimate lens 17, passes though a beam splitter 18 and a ¼ wavelength plate 19, and advances toward a movable optical system 20. In this case, the beam splitter 18 reflects approximately 100% of S polarized light and transmits about 70% of P polarized light, for example, in its nature. Here, approximately 70% of the P polarized light advances exclusively toward the movable optical system 20. The ¼ wavelength plate 19 rotates a polarization direction of the P polarized light by 90° thereby to make the light the P polarized light for a beam splitter 21 in the movable optical system 20. The ¼ wavelength plate 19 is not always needed depending on a layout of respective parts.

The light which enters the movable optical system 20 is reflected by the beam splitter 21, and is focused by an objective 22 on an optical disc 23 of recording an optical data. As aforementioned, the beam splitter 21 reflects approximately 100% off the S polarized light and transmits about 10% of the P polarized light in its nature, so that about 90% of the light is reflected on the beam splitter 21 to be focused on the optical disc 23. A reflective light from the optical disc 23 is reflected on the beam splitter 21 after reading out the data signal, and returns again to the fixed optical system 15. The light led into the fixed optical system 15 is reflected on the beam splitter 18, and is led to a signal detecting optical system 24. The reflective light from the optical disc 23 which is led into the signal detecting optical system 24 is transmitted through a detecting lens 25, and is further transmitted, or reflected by a detecting lens 25 to be led to respective light-receiving elements 27, 28, whereby a reproducing signal, a tracking error signal, and a focusing error signal are detected. In the embodiment of the first optical head, only an offset of the tracking error signal is referred to. So, explanations on the method of detecting the reproducing signal or the focus error signal are omitted.

Figure 1A:
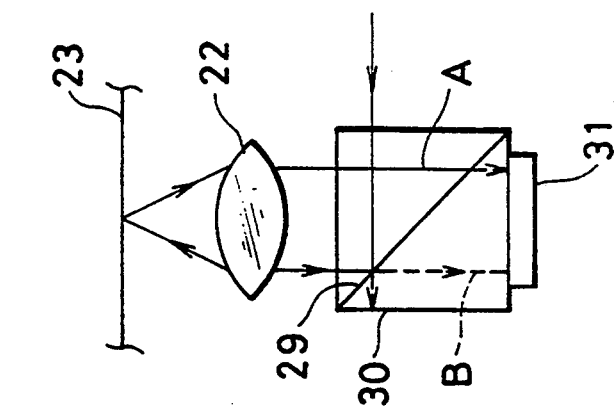
FIG. 1a to FIG. 1c are explanatory views showing a method of canceling a tracking offset in one embodiment of a first optical head of the present invention.

As aforementioned, the embodiment of the first optical head is characterized by the construction of the beam splitter 21. In FIG. 1a, the beam splitter 21 is provided with a polarizing film 29 on a prism boundary face and a reflective face 30 on one side face of the prism. On a bottom face of, the prism of the beam splitter 21 is attached a half-split light receiving element 31 for correcting a tracking offset. Similarly to the aforementioned case, the polarizing film 29 reflects approximately 100% of the S polarized light and transmits about 10% of the P polarized light, for example, in its nature.

Figure 1B:
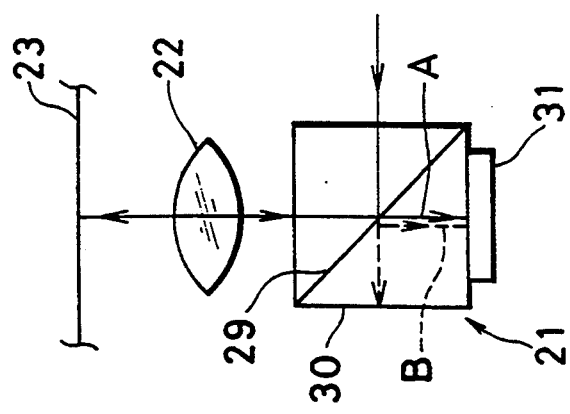

A principle of detecting a tracking error signal by push-pull method, using the beam splitter 21 having such a polarizing film 29, as well as a reflective film 30 will be described referring to FIGS. 1a to 1c & FIGS. 2a to 2c. FIG. 1b shows a state in which there is no offset between an incident optical axis (directing from the fixed optical system 15 to the movable optical axis 20) and a reflective optical axis (directing from the movable optical axis 20 to the fixed optical axis 15). In this case, as shown in FIG. 2b, a light A (a solid line) and a light B (a dashed line) each can form an optical spot centered on a split line of the half-split light-receiving face, in which the light A among lights led from the fixed optical system 15 to the movable optical system 20 is reflected on the beam splitter 21, irradiates an optical disc 23, after that it is transmitted through the beam splitter 21, and is led onto the light-receiving element 31, and in which the light B among lights led from the fixed optical system 15 to the movable optical system 20 is transmitted through the beam splitter 21, is reflected on the reflective face 30, after that it is reflected on the polarizing film 29, and is led onto a half-split light-receiving element 31. Thus, a differential signal of light receiving amounts on the half-receiving faces does not include a tracking offset, whereby a perfect tracking error signal can be obtained.

FIG. 1a shows a state in which the movable optical system 20 is offset upwardly with respect to the light A from the fixed optical system 15. In this case, the light A among the lights from the fixed optical system 15 is reflected on the beam splitter 21, further reflected on the disc face, and is led onto the half-split light-receiving element 31. Then, the optical spot is offset on the left hand from the split-line as shown in FIG. 2a. In such a condition, a signal output on a left side of the light-receiving face is greater than that on a right side of the light receiving face in the half-split receiving face. The tracking offset resulted from the offset of the optical axis is confirmed.

While, the light B among lights from the fixed optical system 15 is transmitted through the beam splitter 21, and is reflected on the reflective face 30, after that the light B is reflected on the polarizing film 29, and is led onto the light-receiving element 31. Then, the optical spot is formed in a position which is offset on the right hand from the split line, thereby a signal output on the right side of the light-receiving face is greater than that on the left side of the light receiving face. When the outputs of such optical spots are synthesized, the tracking offset resulted from the offset of the optical axis is canceled since the two optical spots are offset in opposite directions to each other on the light-receiving face. Therefore, similarly to the aforementioned case in FIG. 1a, in which the optical axis is not offset, the tracking signal including no offset can be obtained.

Figure 1C:
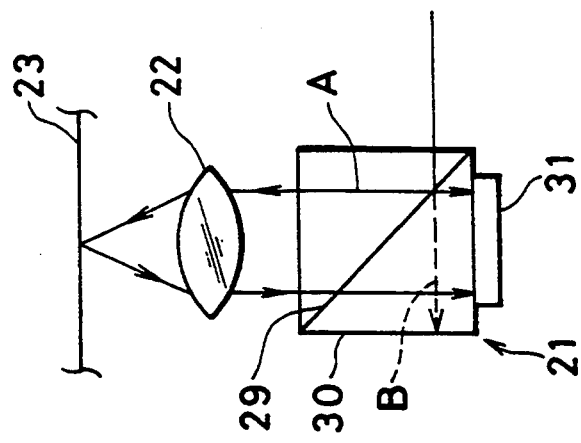

In addition to the above, also in the case where the movable optical system 20 is offset downwardly with respect to the light from the fixed optical system 15 as shown in FIG. 1c, the optical spots of the lights A, B are just opposite to those in FIG. 2a corresponding to FIG. 1a where the movable optical system is offset upwardly. So, the same effect, that is, tracking error signal including no offset can be obtained.

As aforementioned, whereby the light-receiving element 31 is attached onto the beam splitter 21 having the polarizing film 29 and the reflective film 30, whereby the tracking error is detected by push-pull method, using a reflective light from the optical disc 23. Simultaneously, one portion of the light from the optical source is separated by the polarizing film 29 of the beam splitter 21, is reflected on a reflective face 30 to be led to the light receiving element 31, thereby making it possible to cancel the tracking offset resulted from the offset of the optical axis. Thus, the tracking error signal with a high reliability and stability can be detected. Further, it becomes possible to employ the separate type optical system to an optical disc drive device having a long stroke i.e. a large diameter of a disc, so that a high speed access can be realized. Furthermore, a parallel degree adjustment between a seek direction and an optical axis becomes less strict. As a result, assembling of the device is facilitated, and a production cost can be reduced.

A second optical head according to the present invention will be explained with referring to the embodiment in FIGS. 4a and FIG. 4b. The explanation on the same parts as those for the embodiment of the first optical head, and the same references are used for the same parts of the embodiment of the first optical head.

In the aforementioned embodiment of the first optical head, the reflective face 30 of the beam splitter 21 incorporated in the movable optical system 20 is formed perpendicularly to the optical axis of the incident light from the fixed optical system 15. For this reason, about 90% of the polarized light among the lights reflected on the reflective face 30 is reflected on the polarizing film 29 to be led to the half-split light receiving element 31, while about remaining 10% of the light is transmitted as it is through the polarization film 29 and returns to the fixed optical system 15 as a return light C. As a result, the return light C becomes a flare light. When the flare light enters into each of the light-receiving elements 27, 28 within the signal detection optical system 24, it produces a noise which prevents an exact signal detection.

Figure 4A:
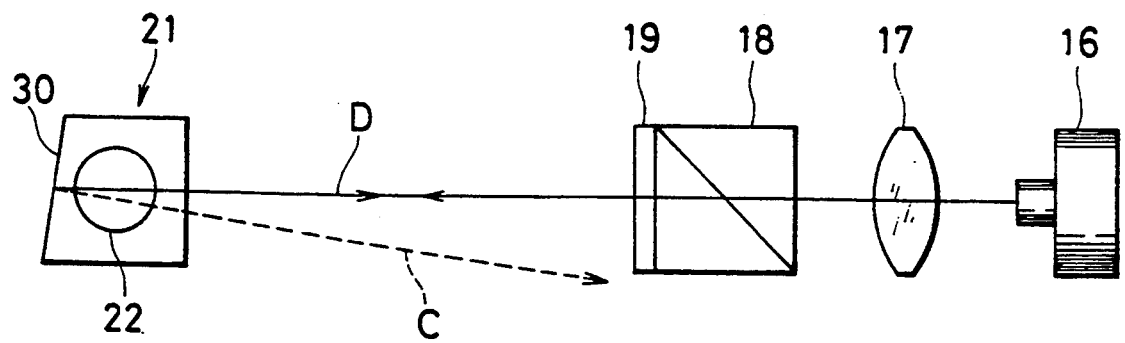
FIG. 4a is a plan view showing one embodiment of a second optical head of the present invention.
Figure 4B:
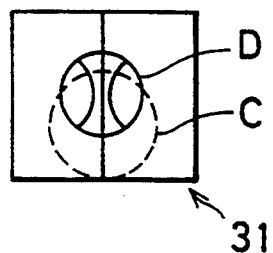
FIG. 4b is a front view showing a state of the optical spot on the light-receiving element.

As shown in the embodiment of FIG. 4a, one face as the reflective face 30 of the beam splitter 21 is inclined such that the optical path of the reflective light C from the reflective face 30 of the beam splitter 21 is not parallel to an optical path of a reflective light D from the optical disc 23 which advances toward the fixed optical system 15.

Since the reflective face 30 is inclined such that the light C from the reflective face 30 does not return to the fixed optical system 15, the flare light is not produced. Therefore, a high C/N reproducing signal and focusing error signal can be detected in a stable condition. Further, when the reflective face 30 is inclined so as to be movable in a direction of a split line of the half-split receiving element 31, the optical spots A, B are movable on the light-receiving element 31 along the split line. Therefore, there is no problem in detecting stably a tracking error signal, and the tracking offset can be effectively removed in the same way.

Figure 5:
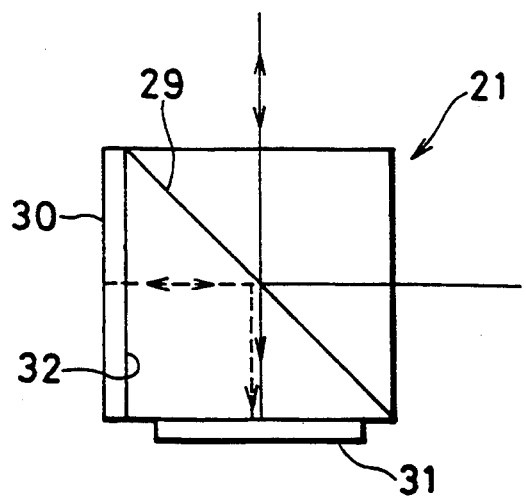
FIG. 5 is a plan view showing one embodiment of a third optical head according to the present invention.

One embodiment of a third optical head according to the present invention will be described with: referring to FIG. 5. The explanations on the same parts as those for the embodiment of the first and the second optical heads are omitted, and the same references are used for the same parts of the embodiments of the first and second optical parts.

In the embodiment of the second optical head, the reflective face 30 is inclined in order to prevent the reflective return light C from the reflective face 30 from returning to the fixed optical system 15. In the embodiment of the third optical head, a preventing means is modified. In addition to the polarizing film 29, the beam splitter 21 is provided with a ¼ wavelength plate 32 attached on one side of a prism. The reflective face 30 is formed on a rear face of the ¼ wavelength plate 32.

Thus, the P polarized light transmitted through the beam splitter 21 is changed into a circularly polarized light by the ¼ wavelength plate 32, and is reflected on the reflective face 30. Then, the circularly polarized light passes again through the ¼ wavelength plate 32 to thereby be changed into the S polarized light, and returns onto the polarized film 29. The polarizing film 29 has a characteristics of reflecting approximately 100% of the S polarized light. Therefore, there is practically no return light passing through the polarizing film 29 and returning toward the fixed optical system 15. Most of the lights are led onto the half-split receiving optical element 31.

In consequence, the flare light is not produced in this embodiment, and a noise does not remain, so that the light is led effectively onto the light receiving elements 27, 28. Thus, this makes it possible to detect stable high C/N reproducing signal and focusing error signal. Further, the tracking offset is removed, and the tracking error signal can be stably obtained.

In a conventional signal detecting method of these three embodiments, an output from a light receiving element for a tracking error signal is not electrically, but optically corrected to remove an offset by using a light receiving element for correcting the optical axis. However, so that a correcting circuit and a light receiving element are not further required, a tracking error signal processing circuit in a general push-pull method is employed as it is, and the production cost is reduced. Further, a tracking error signal can be detected within the movable optical system 20, whereby a separate type optical system such as a large optical disc of from 3.5 inch disc to LD, can be employed. Thus, a quick access can be realized.

One embodiment of a fourth optical head according to the present invention will be described with referring to FIG. 6, FIGS. 7a to 7d, FIGS. 8a to 8d, FIGS. 9a to 9d. The same references are used for the same parts as those of the embodiments of the first to third optical heads.

Figure 6:
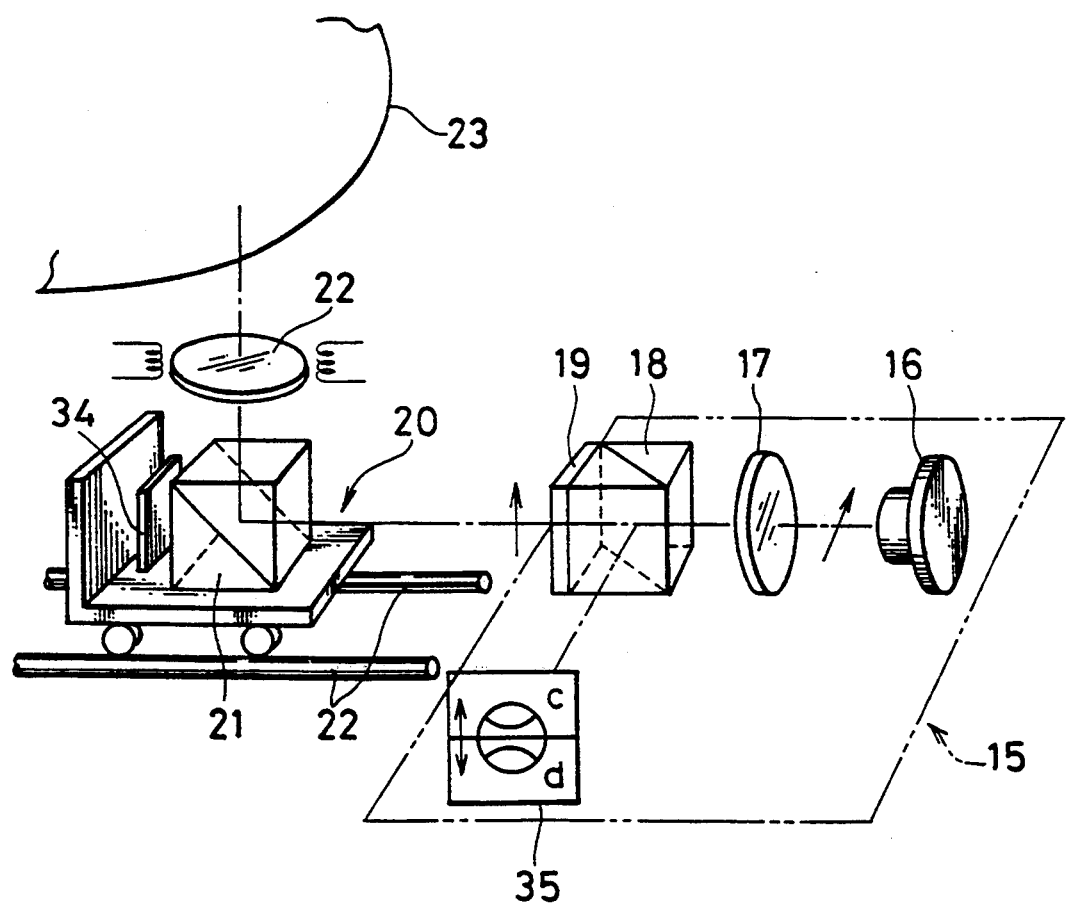
FIG. 6 is a perspective view showing one embodiment of a fourth optical head according to the present invention.
Figure 7A:
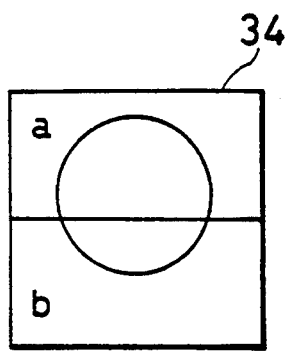
FIGS. 7a to 7d, FIGS. 8a to 8d, and FIGS. 9a to 9d are explanatory views showing a method of canceling the offset of the optical axis.
Figure 7B:
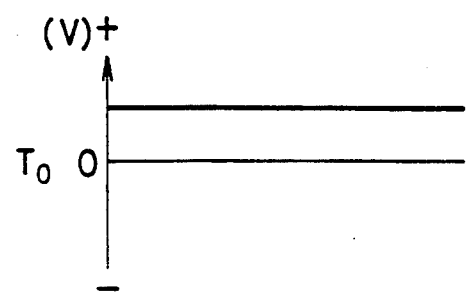
Figure 7C:
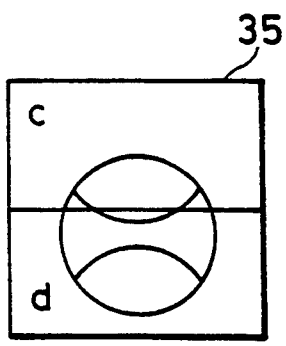
Figure 7D:
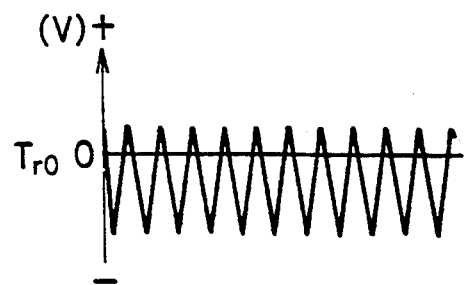
Figure 8A:
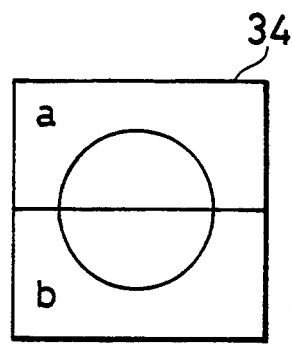
Figure 8B:
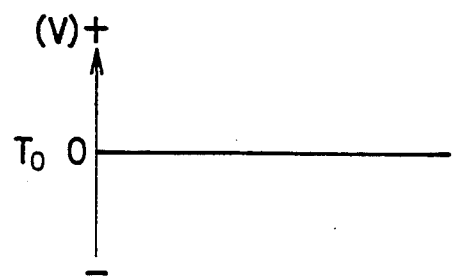
Figure 8C:
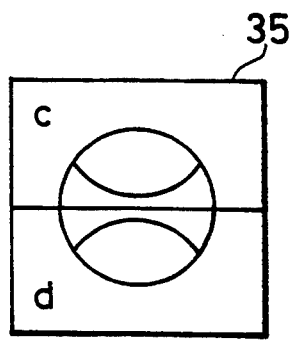
Figure 8D:
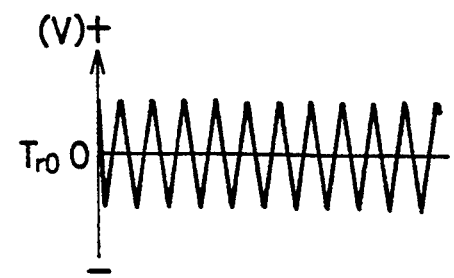
Figure 9A:
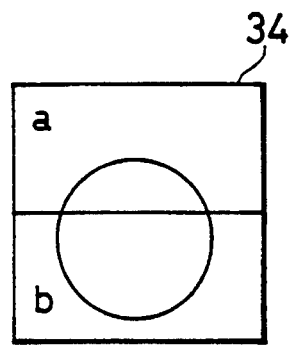
Figure 9B:
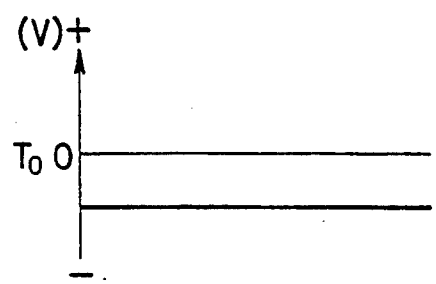
Figure 9C:
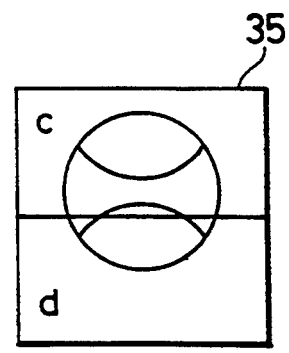
Figure 9D:
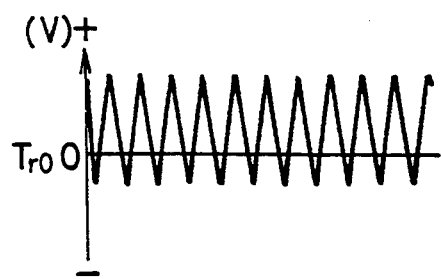

A general construction of the device of the present invention will be described with referring to FIG. 6. In the fixed optical system 15, the light emitted from the semiconductor laser 16 is collimated by a collimate lens 17. The parallel light is transmitted through a beam splitter 18 and a ½ wavelength plate 19 to advance to the movable optical system 20. In this case, the beam splitter 18 having a nature of for example, reflecting approximately 100% of the S polarized light and transmitting about 70% of the P polarized light is used. Thus, the P polarized light among the lights emitted form the semiconductor laser 16 advances exclusively to the movable optical system 20. The ½ wavelength plate 19 is adapted to rotate the polarizing direction of the P polarized light by 90° thereby to make the light the P polarized light for the beam splitter 21 in the movable optical system 20. The movable optical system 20 (d) is movable in X direction on two rails 33.

An incident light from the fixed optical system 15 into the movable optical system 20 is reflected on the beam splitter 21, and is focused by an objective 22 to radiate the optical disc 23 and record a data signal. The beam splitter 21 is characterized by reflecting approximately 100% of the S polarized light and transmitting about 10% of the P polarized light, for example. Thus, the incident light into the beam splitter 21 is transmitted by 10%, and the transmitted light is detected by the light receiving element 34 for correcting the offset of the optical axis. While about 90% of the incident light is reflected on the beam splitter 21 to radiate the optical disc 23. Further, after reading out disc data, the reflective light from the optical disc 23 returns to the fixed optical system 15 passing through the beam splitter 21, and is reflected on the beam splitter 18 to be led to the light receiving element 35 for detecting a tracking error signal of the signal detecting optical system 24. The subject in this embodiment is a method of detecting a track error signal. So, methods of detecting a reproducing signal and a focus error signal are not explained.

A general construction of a main portion of the embodiment will be described hereinafter. In the aforementioned device of FIG. 6, a tracking error signal is detected in a push-pull method by using the light receiving element 35 for detecting a tracking error, having light receiving face c, d divided into two faces. As described in a conventional example, the optical spots are offset on the light receiving faces c, d due to the optical axis offset, whereby an offset is produced tracking error signal.

In the embodiment according to the present invention, a beam splitter 21 transmitting one portion of the light emitted from the fixed optical system 20 is disposed in the movable optical system 20, and a light receiving element 34 for correcting the offset of the optical axis disposed on an optical path passing through this beam splitter 21. A signal for correcting the offset of the optical axis detected by the light receiving element 34 for correcting the offset of the optical axis is used to cancel a tracking offset of the tracking error signal generated in the light receiving element 35 for detecting a tracking error signal.

FIGS. 7a to 7c, FIGS. 8a to 8d, and FIGS. 9a to 9d illustrate embodiments for a method of canceling the tracking offset resulted from the offset of the optical axis, and show a relation between an output of an optical axis displacement correction signal To detected by the light receiving faces a, b of the light receiving element 34 for correcting the offset of the optical axis, and an output of a tracking error signal Tro detected by the light receiving faces c, d of the light receiving element 35 for detecting a tracking error signal. FIGS. 8a to 8d show a state where the optical axis is not offset. A voltage value V of To becomes 0, and the voltage value V of Tro alternate with a center of 0 of the voltage value. FIGS. 7a to 7d show a state where the optical axis is offset upwardly. The voltage V of To becomes positive ($>0$), and the alternate voltage value V of Tro is offset onto a negative side. FIGS. 9a to 9d show a state where the optical axis is offset downwardly. The voltage value V of To is negative ($<0$), and the alternate voltage value V of Tro is offset onto a positive side. Therefore the tracking error signal Tr obtained by the outputs of the two light receiving elements 34, 35, considering into account the offset of the optical axis is as follows:

$$Tr = Tro - To = (c-d) + k(a-b) \quad (1)$$

k: gain constant

In consequence, the tracking offset produced on the light receiving element 35 for detecting the tracking error signal resulted from the offset of the optical axis can be canceled by employing the output of the light receiving element 34 for correcting the offset of the optical axis, whereby the offset in the tracking error signal can not be produced regardless of the offset of the optical axis. Thus, a construction of the optical head becomes simpler by using one beam from the fixed optical system 15 and monitoring it in the movable optical system 20 than by using two beams and detecting an offset of the optical axis by one of the two beams. Further, the correction of the optical axis can be accurately carried out.

As aforementioned, the tracking error signal Tro detected by the push-pull method is added to the optical axis offset correcting signal To which is an output from the light receiving element 34 for correcting the displacement of the optical axis. Thereby, the track offset resulted from the displacement of the optical axis is canceled, and a track error signal Tr having high reliability can be detected. In such a construction, a parallel degree between the seek direction of the movable optical system 20 and the optical axis direction can be less strict, therefore the assembling of the device is facilitated, a low production cost can be realized.

Figure 10:
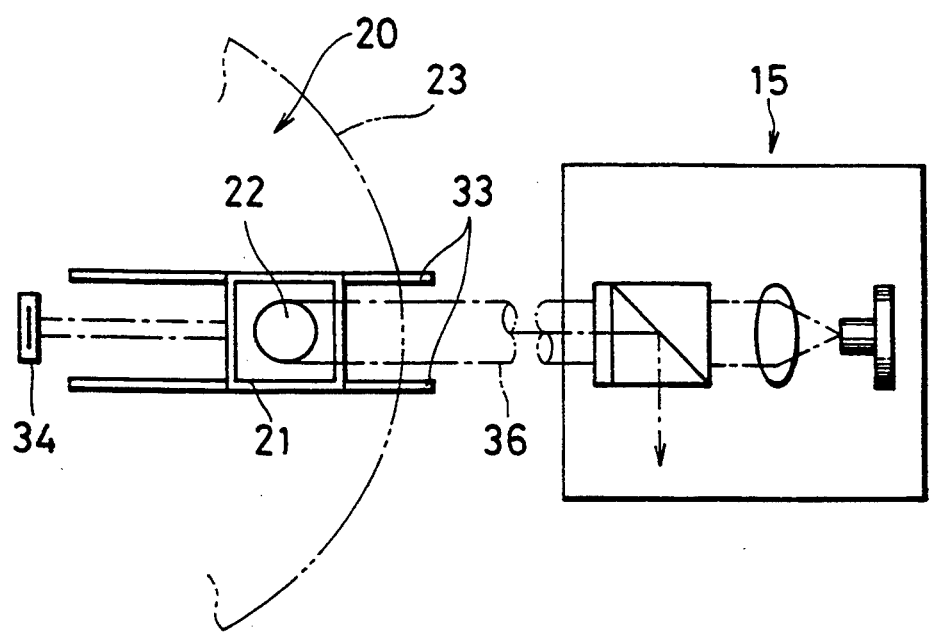
FIG. 10 is a plan view showing one embodiment of a fifth optical head according to the present invention.
Figure 11:
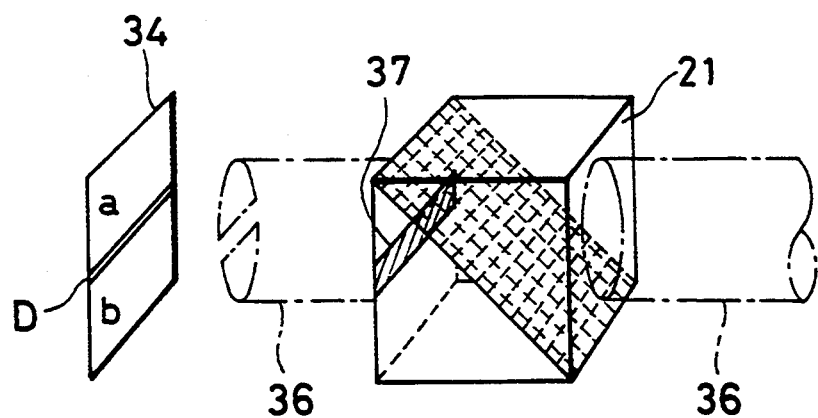
FIG. 11 is a perspective view showing an optical system in the vicinity of the light-receiving element.

One embodiment of a fifth optical head according to the present invention will be described with referring to FIGS. 10 to 12. The same references are used for the same parts as those of the embodiment of the fourth optical head.

In the embodiment of the fourth optical head, the light receiving element 34 for correcting the offset of the optical axis is arranged in the movable optical system 20. However, the arrangement is modified in the embodiment of the fifth optical head. That is, the light receiving element 34 for correcting the offset of the optical axis is arranged in the optical path passing through the beam splitter 21, but outside the movable optical system 20 (and the fixed optical system 15).

Figure 12C:
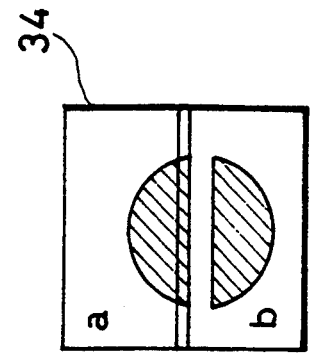
FIG. 12a to FIG. 12c are explanatory view explaining a principle of correction of the offset of the optical axis.
Figure 12B:
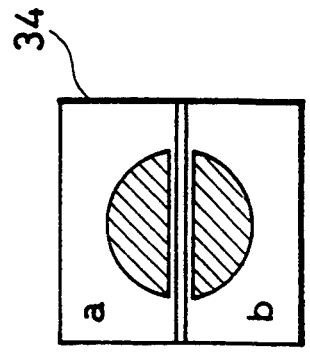
Figure 12A:
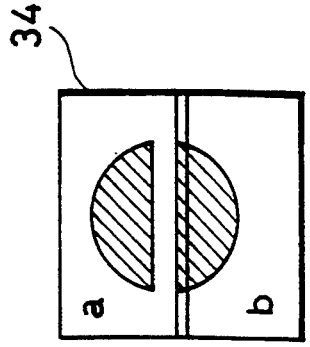

In such a fifth optical head, a beam 36 emitted from the fixed optical system 15 is led to the movable optical system 20, is reflected on the beam splitter 21, and is focused through the objective 22 to irradiate the optical disc 23. While, the light transmitted through the beam splitter 21 is led to the light receiving element 34 disposed separately from the movable optical system 20. In this case, as shown in FIG. 11, a shading band 37 is formed on a face through which the beam of the beam splitter 21 passes. The shading band 37 is formed in the same direction as that of the split line D on the light receiving face a, b of the light receiving element 34. Thus, the black portion of the beam 36 interrupted by the shading band 37 can be coincident with the split line D. If a condition that two outputs of the light receiving faces a, b are equal to each other is supported that there is no offset of the optical axis, when the optical axis is offset, the offset can be detected by a difference of the outputs thereof. FIG. 12a to FIG. 12c show the state of the offset of the light receiving faces a, b. FIG. 12b shows the case where the relation of the outputs values is $a-b=0$ and therefore no offset of the optical axis. FIGS. 12a and FIG. 12c show the cases where the relations of the outputs values are $a-b<0$, and $a-b>0$, and therefore the offset of the optical axis. Such a offset of the optical axis causes to produce a tracking offset. However, by applying this detection method to a method of canceling the track offset as shown in FIGS. 7a to 7d, FIGS. 8a to 8d, and FIGS. 9a to 9d, a tracking error signal Tr in which the tracking offset is canceled can be obtained from the equation (1).

As aforementioned, the light receiving element 34 for correcting the offset of the optical axis is disposed separately from the movable optical system 20. As a result, the movable optical system 20 is lightened, a quick access can be realized. In addition, an influence by mechanical vibration is small, and reliability can be improved. Since the optical path becomes longer by arranging the light receiving element 34 outside the movable optical system, the light receiving element 34 is not easily affected by a flare produced by the beam splitter 21.

Figure 13:
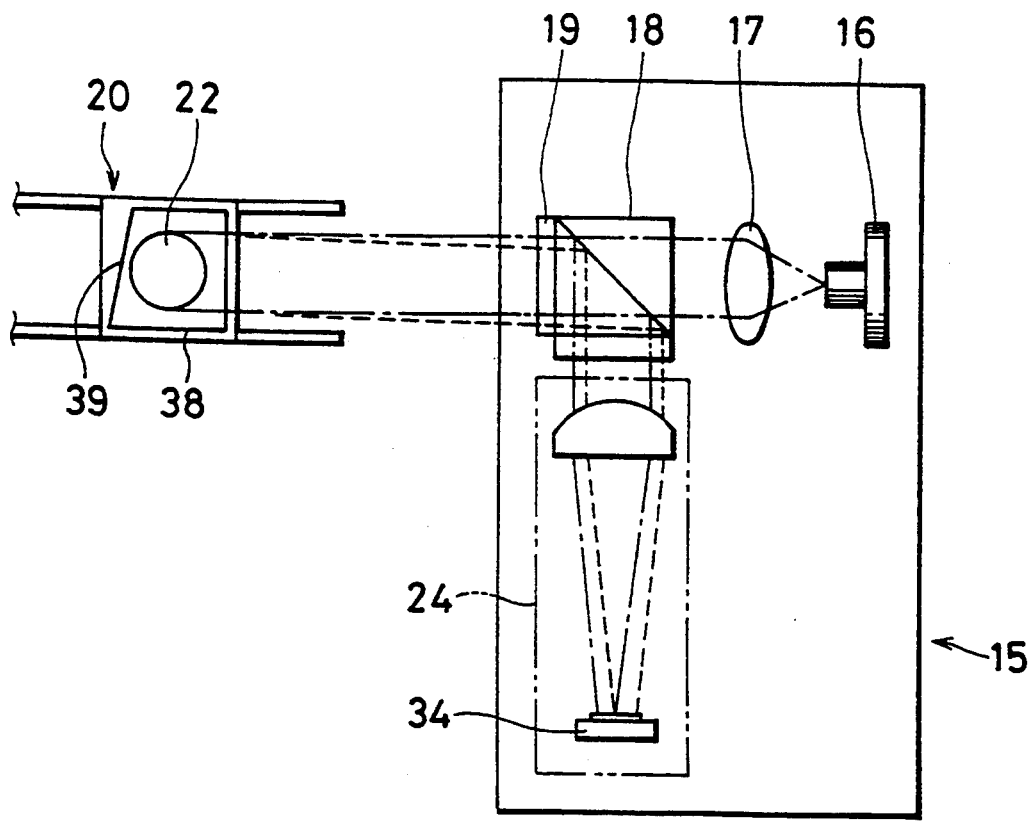
FIG. 13 is a plan view showing one embodiment of a sixth optical head of the present invention.

A sixth optical head according to the present invention will be described with referring to FIG. 13 to FIG. 15. The same references are used for the same parts as those of the embodiments of the fourth and the fifth optical head.

Similarly to the embodiment of the fifth optical head, the arrangement of the light receiving element for correcting the optical axis 34 is modified. That is, the beam splitter 38 having an inclined reflective face 39 is disposed within the movable optical system 20. The light receiving element 34 is disposed in the signal detecting optical system of the fixed optical system 15. The light receiving element 34 detects the light which is reflected on the inclined reflective face 39, and returns to the fixed optical system 15.

Figure 14:
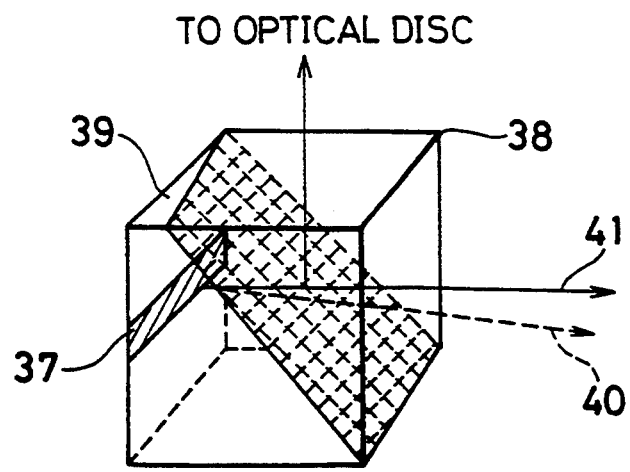
FIG. 14 is a perspective view showing a shape of a beam splitter.
Figure 15A:
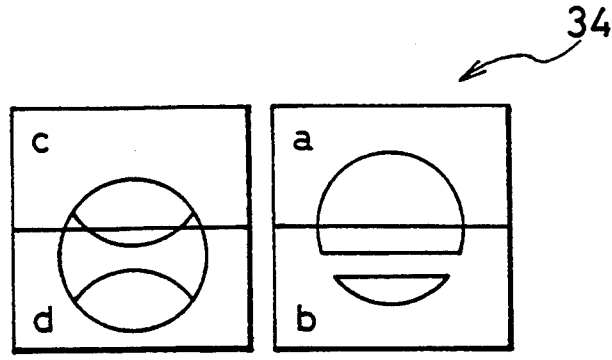
FIG. 15a to FIG. 15c are explanatory views each showing the offset of the optical axis on a light-receiving element for correcting the offset of the optical axis.
Figure 15B:
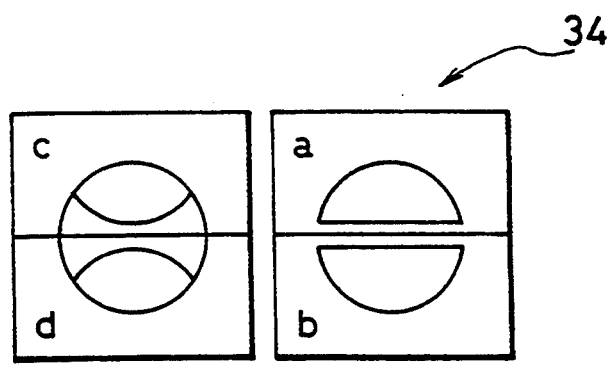
Figure 15C:
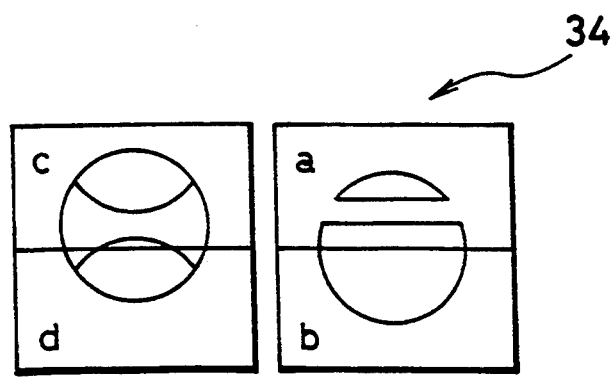

FIG. 14 shows a construction of a beam splitter 38 having an inclined reflective face 39. The light (a light for correcting the offset of the optical axis) reflected on the inclined reflective face 39 is slightly angularly offset from the light (signal light) 41 led into the signal detecting optical system 24. As shown in FIGS. 15a and 15b, the light 40 for correcting the offset of the optical axis is conducted onto the light receiving faces a, b of the light receiving element 34 in the signal detecting system 24, so that an optical axis offset correction signal To can be detected. Further, a signal light 41 is led onto the light receiving faces c, d of the light receiving element 34, so that the track error signal Tro can be detected. Thus, the tracking error signal Tr can be obtained in which the tracking offset is canceled from the equation (1). FIG. 15b shows the case where there is no offset of the optical axis. FIG. 15a shows the case where the optical axis is offset upwardly. FIG. 15c shows the case where the optical axis is offset downwardly. Although in the embodiment according to the present invention, the shading band 37 for dividing the beam into two is used to detect the offset of the optical axis. In addition to that, a circular or cruciate shading band, or an irregularity formed on the reflective face allows to obtain the same effect.

As aforementioned, the light receiving element 34 can be attached on the same plate as that for the light receiving element (referred to herewith the light receiving faces c, d) for detecting a reproducing signal and a servo signal (tracking error signal or the like). Therefore, the number of the light receiving elements can be reduced, and an electric circuit can be simplified, thereby allowing to obtain a small sized device and to realize reduction of the production cost of the device.

One embodiment of each of a seventh and an eighth optical head according to the present invention will be described with referring to FIG. 16 and FIG. 17. The same references are used for the same parts as those of the embodiments of the fourth to sixth optical heads.

The beam splitter 21, 38 used in the embodiments of the fourth to sixth optical heads have a disadvantage which can not be avoided in growing a film. The disadvantage of the beam splitter is that a transmission coefficient and a reflective coefficient changes sensitively to an incident angle of the light entering the beam splitter 21, 38. Such beam splitters 21, 38 have no problem, if they are used in a usual way. However, as shown in FIG. 17, at a defocusing time, the reflective light from the optical disc 23 becomes convergent light or divergent light. The incident angle of beam B1, B2, B3 to the polarizing film of the beam splitter 21 are $45° + \alpha$, $45°$ and, $45° - \alpha$, respectively, and thus different from each other. These different incident angles of three beams B1, B2, and B3 result in different reflective coefficient thereof. As a result, an intensity distribution of the beam reflected on the polarizing film differs from that of the beam just after the reflection on the optical disc 23. In consequence, in the construction where a track pattern is produced in Z direction of FIG. 15, "the offset of the intensity distribution of the beams due to the offset of the track" is not distinguishable from "the offset of intensity distribution of the beam due to defocusing", Therefore, the tracking offset is inevitably produced.

Figure 16:
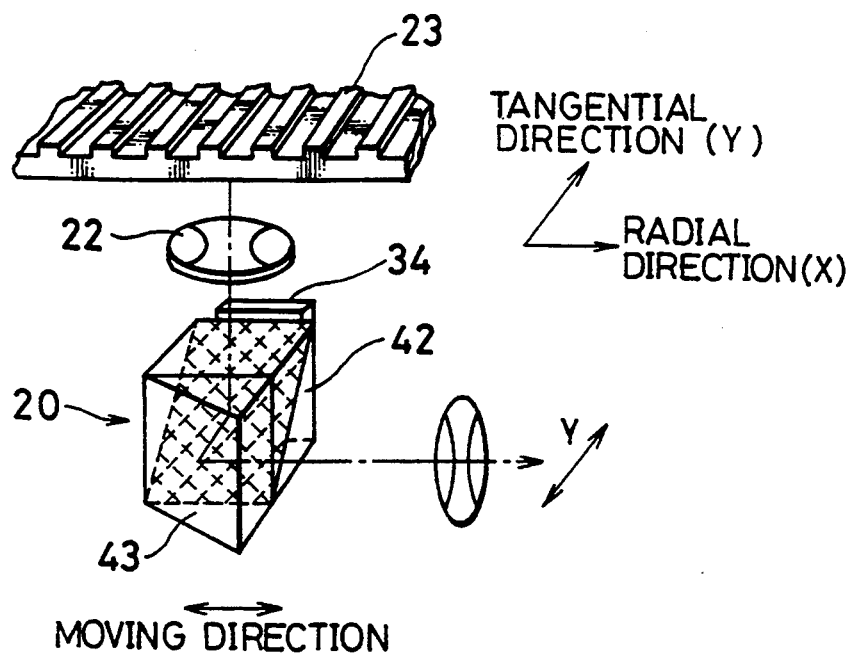
FIG. 16 is a perspective view for showing one embodiment of a seventh optical head according to the present invention.
Figure 17:
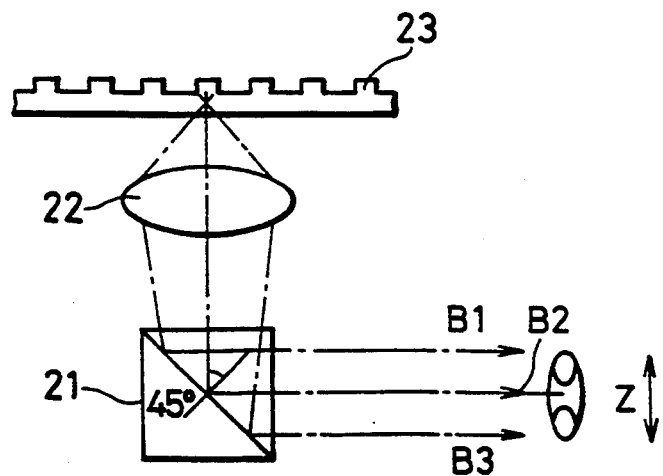
FIG. 17 is a side view for showing the offset of an incident angle during defocusing.
Figure 18A:
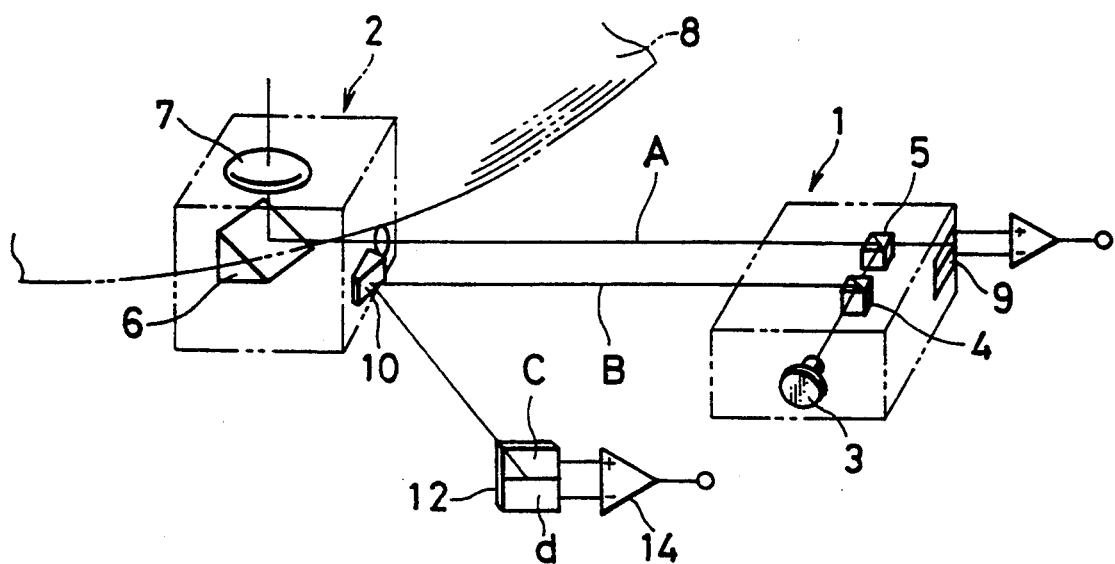
FIG. 18a is a perspective view for showing a construction of a conventional optical head.
Figure 18B:
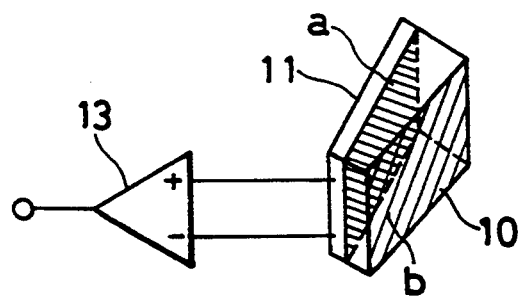
FIG. 18b is a perspective view for showing one portion of an optical part of the conventional optical head.

In this embodiment, a beam splitter 42 transmitting one portion of the beam is disposed in the movable optical system 20, as shown in FIG. 16. The beam splitter 42 is provided on one face thereof with a total reflection prism 43 for reflecting the beam emitted from the fixed optical system 15 and causing the reflective light to enter the beam splitter 42. The light receiving element 34 for correcting the offset of the optical axis is disposed in the optical path of the beam transmitted though the beam splitter 42.

In FIG. 16, the light reflected on the optical disc passes through the objective 22 and enters the beam splitter 42. The beam splitter 21 of FIG. 17 is arranged so as to direct the beam reflected on the optical disc 23 in a radial direction X. In this embodiment, the beam splitter is arranged so as to direct the beam reflected on the optical disc 23 in a tangential direction Y. Thus, the track pattern changes its direction from Z to Y. So, even if the reflective coefficients differ from each other by defocusing, the difference in a reflective coefficient is not produced in a tracking direction. In consequence, there is no offset in a tracking error signal.

As aforementioned, the total reflective prism 43 is disposed in the optical path to change the advancing direction of the beam, the direction of the track pattern can be changed from Z direction to Y direction which is formed by rotating the Z direction by 90°. Thus, the offset of the coefficient by defocusing can not affect the tracking error signal. A stable tracking error signal including a small offset can be detected.

This embodiment is not limited to the embodiment where the light receiving element 34 for correcting the optical axis is disposed in the movable optical system. The light receiving element 34 may be disposed outside the movable optical system (see FIG. 10), or the light receiving element 34 may be disposed in the fixed optical system 15 (see FIG. 13) by disposing the beam splitter 38 having the inclined reflective face 39 in the movable optical system 20. Such constructions ensure also a removal of the offset of the optical axis. In this case, the number of components can be reduced, so that the device can be small sized.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical head for recording, reproducing and erasing data on an optical data recording medium, comprising:
   a fixed optical system having a laser optical source for emitting a light, and a signal detecting optical system for detecting an error signal; and
   a movable optical system having a beam splitter provided with a prism boundary face, and an objective at a position thereof opposing a surface of said optical data recording medium, said objective for receiving said emitted light from said laser light source through said beam splitter and focusing said received light on to said surface of said optical data recording medium as an optical spot;
   said beam splitter having at said prism boundary face thereof a polarizing film for transmitting one portion of said emitted light from said laser light source, having at one side face thereof a reflective face for reflecting one portion of or all of said transmitted light through said polarizing film, and having at another side face thereof a light receiving element for receiving both of said reflected light from said reflective face and one portion of said reflected light from said surface of said optical data recording medium to cancel an offset of an optical axis.

2. An optical head according to claim 1, wherein said reflective face is inclined in such a manner that an optical path of said reflected light from said reflective face of said beam splitter is not parallel to an optical path of a reflected light from said optical disc which advances toward said fixed optical system.

3. An optical head according to claim 1, wherein said beam splitter further includes a ¼ wavelength plate between said one side face of said beam splitter and said reflective face.

4. An optical head for recording, reproducing and erasing data on an optical data recording medium, comprising:
- a fixed optical system having a laser optical source for emitting a light, and a signal detecting optical system for detecting an error signal; and
- a movable optical system having a beam splitter for transmitting one portion of said emitted light from said laser optical source, having an objective at a position thereof opposing a surface of said optical data recording medium, said objective for receiving said emitted light from said laser optical source through said beam splitter and focusing said received light onto said surface of said optical data recording medium as an optical spot, and having a light receiving element for receiving the other portion of said emitted light from said laser optical source to detect an offset of an optical axis at an optical path passing through said beam splitter.

5. An optical head according to claim 4, wherein said light receiving element for correcting the offset of the optical axis is arranged in said optical path passing through said beam splitter, but outside said movable optical system.

6. An optical head according to claim 4, wherein said beam splitter is provided on one face thereof with a total reflection prism for reflecting said emitted light from said laser optical source and causing said reflected light to enter said beam splitter.

7. An optical head for recording reproducing and erasing data on an optical data recording medium, comprising:
- a fixed optical system having a laser optical source for emitting a light, and a signal detecting optical system for detecting an error signal; and
- a movable optical system having a beam splitter provided with an inclined reflective face for reflecting one portion of said emitted light from said laser optical source at a different angle from said emitted light without reflecting said emitted light to said optical data recording medium having an objective at a position thereof opposing a surface of said optical data recording medium said objective for receiving said emitted light from said laser light source through said beam splitter and focusing said received light onto said surface of said optical data recording medium as an optical spot,
- said signal detecting optical system further including a light receiving element for receiving said light which is reflected on said inclined reflective face and returns to said fixed optical system to detect an offset of an optical axis.

8. An optical head according to claim 7, wherein said beam splitter is provided on one face thereof with a total reflection prism for reflecting said emitted light from said laser optical source and causing said reflected light to enter said beam splitter.

* * * * *

UNITED STATES PATENT AND TRADEMARK OFFICE
CERTIFICATE OF CORRECTION

PATENT NO. : 5,428,588
DATED : June 27, 1995
INVENTOR(S) : Shigeru OHUCHIDA

It is certified that error appears in the above-indentified patent and that said Letters Patent is hereby corrected as shown below:

On the title page, Item [30], the first Foreign Application Priority Number should read:

--4-249332--

Signed and Sealed this

Twelfth Day of September, 1995

Attest:

BRUCE LEHMAN

*Attesting Officer*     *Commissioner of Patents and Trademarks*